US010297056B2

(12) United States Patent
Sudidhala (10) Patent No.: US 10,297,056 B2
(45) Date of Patent: May 21, 2019

(54) METHOD AND SYSTEM FOR REMOTELY ANNOTATING AN OBJECT IN REAL-TIME

(71) Applicant: Wipro Limited, Bangalore (IN)

(72) Inventor: Raja Sekhar Reddy Sudidhala, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 64 days.

(21) Appl. No.: 15/046,960

(22) Filed: Feb. 18, 2016

(65) Prior Publication Data

US 2017/0178374 A1 Jun. 22, 2017

(30) Foreign Application Priority Data

Dec. 18, 2015 (IN) ............ 6769/CHE/2015

(51) Int. Cl.
| | |
|---|---|
| *G06T 11/60* | (2006.01) |
| *G06T 19/20* | (2011.01) |
| *G09B 5/14* | (2006.01) |
| *H04M 3/56* | (2006.01) |
| *H04N 7/15* | (2006.01) |
| *G06K 9/46* | (2006.01) |
| *G06K 9/00* | (2006.01) |
| *G06Q 10/10* | (2012.01) |

(52) U.S. Cl.
CPC .......... *G06T 11/60* (2013.01); *G06K 9/00671* (2013.01); *G06Q 10/101* (2013.01); *G06T 19/20* (2013.01); *G09B 5/14* (2013.01); *G06K 9/4671* (2013.01); *H04M 3/567* (2013.01); *H04M 2203/359* (2013.01); *H04N 7/15* (2013.01)

(58) Field of Classification Search
None
See application file for complete search history.

(56) References Cited

U.S. PATENT DOCUMENTS

| | | | |
|---|---|---|---|
| 8,621,362 B2 | 12/2013 | Castellani et al. | |
| 9,128,520 B2 | 9/2015 | Geisner et al. | |
| 2008/0291217 A1* | 11/2008 | Vincent | G06T 17/05 345/629 |
| 2013/0222385 A1* | 8/2013 | Dorsey | G06T 11/20 345/427 |

(Continued)

*Primary Examiner* — Nurun N Flora
(74) *Attorney, Agent, or Firm* — Finnegan, Henderson, Farabow, Garrett & Dunner, LLP (57) ABSTRACT

The present disclosure relates to method and system for annotating an object in real-time which comprises object database, remote device and real-time annotating unit. Real-time annotating unit receives video stream comprising one or more objects and identifies at least one object in video stream to be annotated by comparing at least one frame of video stream with predefined frames comprising one or more objects in object database. Further, real-time annotating unit determines orientation data of at least one object and obtains unique context identifier (UCID) associated with each of at least one object. The real-time annotating unit further provides UCID associated with at least one object to remote device and receives annotated data, from remote device, generated based on UCID and remote expert inputs. Further, real-time annotating unit converts annotation data to 3D space coordinates and renders converted annotated data on at least one object based on orientation data.

21 Claims, 8 Drawing Sheets

(56) References Cited

U.S. PATENT DOCUMENTS

2014/0195914 A1\* 7/2014 Gillard ............ H04N 21/25891
  715/719
2014/0225924 A1\* 8/2014 Loxam .................. G06T 19/006
  345/633

\* cited by examiner

METHOD AND SYSTEM FOR REMOTELY ANNOTATING AN OBJECT IN REAL-TIME

FIELD OF THE DISCLOSURE

The present subject matter generally relates to annotating an object. More particularly, but not exclusively, the present disclosure discloses a system and a method for remotely annotating at least one object in real-time.

BACKGROUND

Conventional systems relate to retrieving physical parameters of an object and further visualising the object for augmenting the object. In one conventional system, sensor is coupled to the object to generate live data and the physical parameters computed based on the live data. The physical parameters are used for visualising the object. In another conventional system, method for augmenting is disclosed where image of the object is received which includes information defining a sampled frame of a video being captured by an electronic device in substantially real time. Further, content of the object is obtained based on the information and is used for display of the object on the electronic device. The display of the object is configured to enable a user to interact with the object through the display.

In another conventional system, an approach for real-time manipulation of objects within multiple dynamic and augmented video streams synchronized in an Augmented Reality (AR) or multi-dimensional space is disclosed. In this approach, users of first AR system will be able to connect with participants of a second AR system and to share their initial and/or augmented video streams with the participants to enhance the AR experience from one participant to many. Through real time synchronization of augmented video streams in the AR systems, the user and the participants will be able to see, share, manipulate and interact with the augmented objects either in his/her own augmented video streams or in the augmented video streams of another user.

In another conventional system, an augmented reality technology incorporated in land surveying, 3D laser scanning, and digital modelling processes is disclosed. In the conventional system, mobile device is configured to display an augmented reality image comprising a real view of a physical structure in real environment and a 3D digital model of an unbuilt design element overlaid on top of the physical structure at its intended tie-in location.

SUMMARY

Disclosed herein is method and device for remotely annotating at least one object in real time. The method includes initially receiving a video stream comprising one or more objects from a site device and identifying the at least one object in the video stream which is to be annotated by comparing at least one frame of the video stream with predefined frames comprising the one or more objects in an object database. Further, the method includes determining orientation data of the at least one object identified in the video stream and obtaining a unique context identifier (UCID) associated with each of the at least one object from the object database. Further, the UCID associated with the at least one object is provided to a remote device. Further, the method includes receiving annotated data, from the remote device, generated based on the UCID and remote expert inputs and converting the annotation data to three dimensional (3D) space coordinates. The converted annotated data is rendered on the at least one object based on the orientation data for remotely annotating the at least one object.

In one embodiment, the present disclosure relates to a real-time annotating unit for remotely annotating at least one object. The real-time annotating unit comprises a processor and a memory communicatively coupled to the processor and the memory stores processor-executable instructions which on execution cause the processor to annotate. The real-time annotating unit receives a video stream comprising one or more objects from a site device and identifies the at least one object in the video stream to be annotated by comparing at least one frame of the video stream with predefined frames comprising the one or more objects in an object database. Further, the real-time annotating unit determines orientation data of the at least one object identified in the video stream and obtains a unique context identifier (UCID) associated with each of the at least one object from the object database. The real-time annotating unit further provides the UCID associated with the at least one object to a remote device and receives annotated data, from the remote device, generated based on the UCID and remote expert inputs. Further, real-time annotating unit converts the annotation data to three dimensional (3D) space coordinates and renders the converted annotated data on the at least one object based on the orientation data.

In another embodiment, the present disclosure relates to a non-transitory computer readable medium including instructions stored thereon that when processed by at least one processor cause a device to perform operations to remotely annotate an object in real-time. The operations include receiving a video stream comprising one or more objects from a site device; identifying the at least one object in the video stream to be annotated by comparing at least one frame of the video stream with predefined frames comprising the one or more objects in an object database; determining orientation data of the at least one object identified in the video stream; obtaining a unique context identifier (UCID) associated with each of the at least one object from the object database; providing the UCID associated with the at least one object to a remote device; receiving annotated data, from the remote device, generated based on the UCID and remote expert inputs; converting the annotation data to three dimensional (3D) space coordinates; and rendering the converted annotated data on the at least one object based on the orientation data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a faster and reliable method for annotating an object in real-time remotely. The method includes initially receiving a video stream comprising one or more objects from a site device. At least one object is identified in the video stream which is to be annotated by comparing at least one frame of the video stream with predefined frames comprising the one or more objects in an object database. Further, orientation data of the at least one object is determined and UCID associated with each of the at least one object is obtained from the object database. Further, the UCID is with the at least one object is provided to a remote device. Further, annotated data is received from the remote device which is generated based on the UCID and remote expert inputs, and the received annotation data is converted to three dimensional (3D) space coordinates. The converted annotated data is rendered on the at least one object based on the orientation data for remotely annotating the at least one object.

Figure 1:
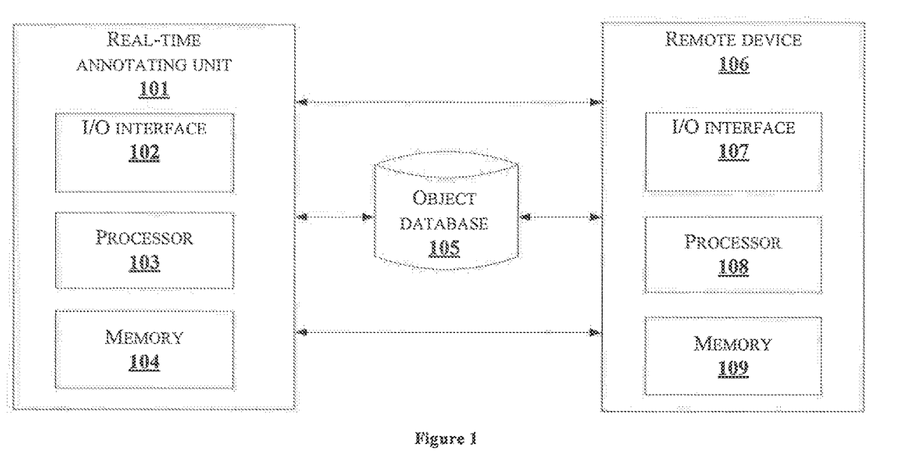
FIG. 1 illustrates an exemplary system for remotely annotating at least one object in real-time in accordance with some embodiments of the present disclosure.

FIG. 1 illustrates an exemplary system for remotely annotating at least one object in real-time in accordance with some embodiments of the present disclosure.

The exemplary system for annotating at least one object in real-time comprises a real-time annotating unit 101, an object database 105 and a remote device 106. The real-time annotating unit 101 comprises I/O interface 102, processor 103 and memory 104. The remote device 106 also comprises I/O interface 107, processor 108 and memory 109. In one implementation, the real-time annotating unit 101 and the remote device 106 may be implemented in a variety of computing systems, such as a laptop computer, a desktop computer, a Personal Computer (PC), a notebook, a smartphone, a tablet, a server, a network server, and the like.

The memory 104 in the real-time annotating unit 101 is communicatively coupled to the processor 103. The memory 104 stores processor executable instructions which on execution help the real-time annotating unit 101 to annotate at least one object in real-time remotely. The processor 102 may comprise at least one data processor for executing program components for annotating the at least one object by receiving the annotated data from the remote device. The real-time annotating unit 101 is configured to receive a video stream via I/O interface 102 comprising one or more objects from a site device. In one embodiment, the video stream may be captured by a camera embedded with the real-time annotating unit 101. Further at least one object in the video stream which is to be annotated is identified by real-time annotating unit 101. An object is identified by comparing at least one frame of the video stream with predefined frames comprising the one or more objects. The predefined frames are obtained from the object database via the I/O interface 102. Further, orientation data of the at least one object identified in the video stream is determined by the real-time annotating unit 101 and a UCID associated with each of the at least one object is obtained. The UCID is obtained from the object database 105. The real-time annotating unit 101 further provides the UCID associated with the at least one object to a remote device 106 and receives annotated data from the remote device 106 via the I/O interface 102. The annotated data is generated based on the UCID and remote expert inputs at the remote device 106. The annotated data is converted to three dimensional (3D) space coordinates and rendered on the at least one object in the video stream based on the orientation data by the real-time annotating unit 101. In one embodiment, the video stream may be displayed on a display unit associated with the real-time annotating unit 101.

Communication of the real-time annotating unit 101 is achieved via the communication network through I/O interface 102 of the real-time annotating unit 101. In one embodiment, the annotated data, the predefined frames and the UCID may be received by the real-time annotating unit 101 in form of data packets. In one embodiment, the communication network is configured to be in listening mode and accept the data packets. In a non-limiting embodiment, the real-time annotating unit 101 decodes the received data packets as one of General Packet Radio Service (GPRS) packets, Open Building Information Exchange (OBiX) files, File Transfer Protocol (FTP) files and others associated with the data packets.

The memory 109 in the remote device 106 is communicatively coupled to the processor 108. The memory 109 stores processor executable instructions which on execution help the remote device 106 to obtain the remote expert inputs and provide the annotated data to the real-time annotation unit 101. The processor 108 may comprise at least one data processor for executing program components for receiving UCID from the real-time annotating unit 101. Upon receiving the UCID, predefined object frame associated with the UCID is obtained by the remote device 106 from the object database 105 via I/O interface 107. The remote expert inputs are provided on the predefined object frame in the remote device 106. In one embodiment, the remote expert inputs may be a touch provided through an input module associated with the remote device 106 via I/O interface 107.

In one embodiment the object database can be within the real time annotating unit and remote device each.

Figure 2:
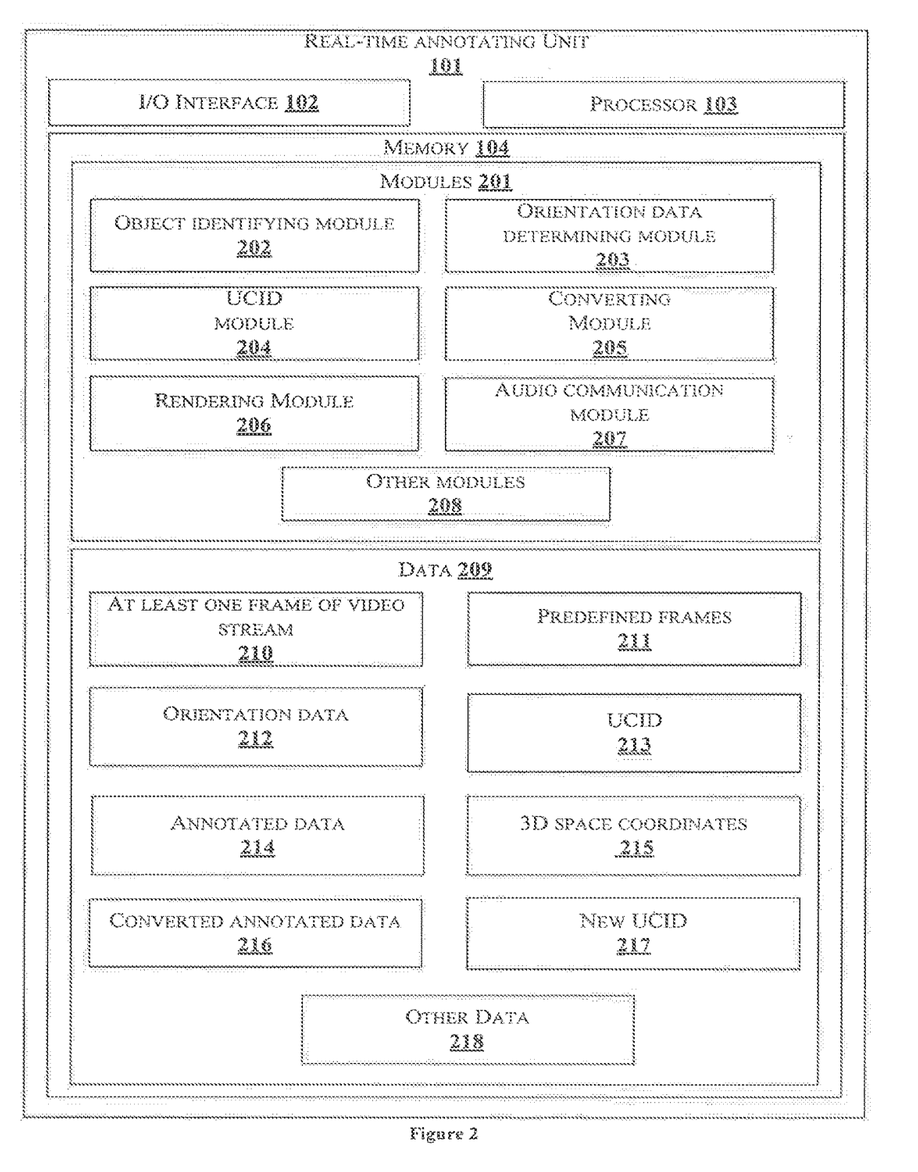
FIG. 2 illustrates a detailed block diagram of an exemplary real-time annotating unit with various data and modules for annotating at least one object in real-time from a remote device in accordance with some embodiments of the present disclosure.

FIG. 2 illustrates a detailed block diagram of an exemplary real-time annotating unit with various data and modules for annotating at least one object in real-time from a remote device 106 in accordance with some embodiments of the present disclosure. In the illustrated FIG. 2, the one or more data 109 and the one or more modules 201 stored in the memory 108 are described herein in detail.

In an embodiment, the one or more data 209 in the memory 104 are processed by the one or more modules 201 of the real-time annotating unit 101. The one or more modules 201 may be stored within the memory 104 as shown in FIG. 2. In an example, the one or more modules 201, communicatively coupled to the processor 103, may also be present outside the memory 104 and implemented as hardware. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In one embodiment, the one or more data 209 may include, for example, at least one frame of video stream 210, predefined frames 211, orientation data 212, UCID 213, annotated data 214, 3D space co-ordinates 215, converted annotated data 216, new UCID 217 and other data 219 for the performance of the real-time annotation unit 101.

Initially, the real-time annotating unit 101 receives the video stream which comprises one or more object from the site device. Further, at least one object from the one or more objects, which is to be annotated, is identified in the video stream. The at least one object is identified by comparing at least one frame of the video stream 210 with predefined frames 211. The at least one frame of the video stream 210 is captured by the real-time annotating unit 101. The predefined frames 211 are obtained from the object database 105. The predefined frames comprises pre-trained frames of the at least one object.

The orientation data 212 of the at least one object is determined by the real-time annotating unit 101. The orientation data 212 is determined by comparing the at least one frame 210 comprising the at least one object with a predefined object frame obtained from an object database. The predefined object frame is selected from the predefined frames 211 in the object database 105.

Upon determining the orientation data 212, the UCID 213 associated with each of the at least one object is obtained by the real-time annotating unit 101 from the object database 105. The UCID 213 is a unique text associated with each of the at least one object and stored in the object database 105. Each of the at least one object is identified from its UCID 213. Upon determining the UCID 213, the UCID 213 is provided to the remote device 106.

The annotated data 214 is received from the remote device 106 which is generated based on the UCID 213 and the remote expert inputs at the remote device 106. Further, the annotated data is converted to 3D space coordinates 215. The 3D space coordinates 215 are determined based on the co-ordinates on the at least one object.

Upon the conversion, the converted annotated data 216 is rendered on the at least one object based on the orientation data 212 in the video stream. In one embodiment, the rendered annotated data may be in a visual format.

Further, in one embodiment, during identifying of the at least one object, if the identified at least one object is not matching with the predefined frames obtained from the object database, a new object is recognized by the real-time annotating unit 101 and a new UCID 217 is assigned to the new object and provided to the object database 105 for annotations of the new object.

The other data 218 may refer to such data which can be referred for remotely annotating at least one object by the real-time annotating unit 101.

In one implementation, the one or more modules 201 may include, for example, object identifying module 202, orientation data determining module 203, UCID module 204, converting module 205, rendering module 206, audio communication module 207 and other modules 208 associated with the real-time annotating unit 101.

The object identifying module 202 is configured to identify the at least one object in the video stream by comparing the at least one frame of the video stream 210 with the predefined frames 211.

Orientation data determining module 203 is configured to determine the orientation data 212 of the at least one object identified in the video stream. The orientation data 212 is determined by comparing the at least one frame 210 comprising the at least one object with a predefined object frame obtained from an object database.

The UCID module 204 is used for obtaining the UCID 213 from the object database 105. The at least one object is identified and associated UCID 213 is obtained.

Upon receiving the annotated data 214 from the remote device 106, the converting module 205 is configured to convert the annotated data 214 to 3D space coordinates and the rendering module 206 is configure to render the converted annotated data 216 on the at least one object in the video stream.

The other modules 206 may refer to such modules which can be referred for managing the performance of the instrumentation devices 102.

Figure 3:
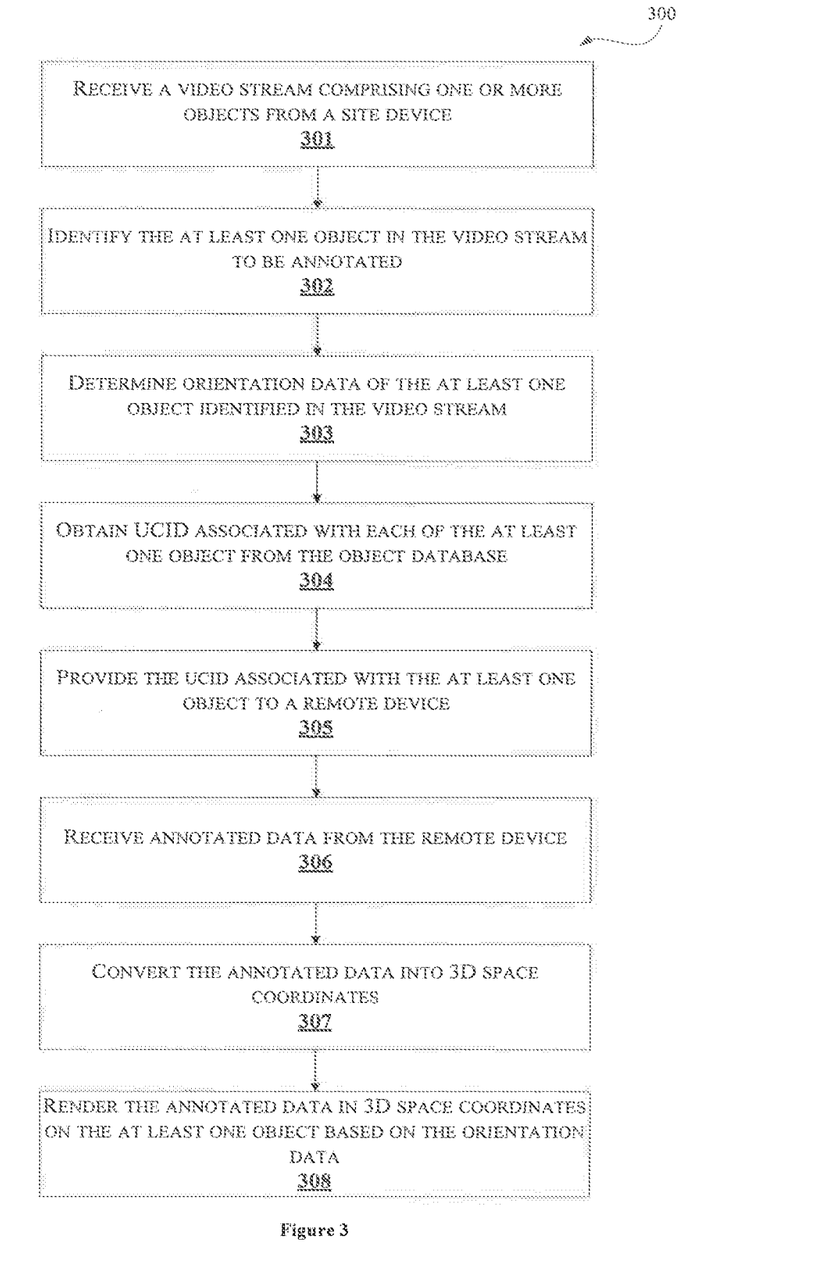
FIG. 3 shows a flowchart illustrating a method for annotating at least one object in real-time from a remote device in accordance with some embodiments of the present disclosure.

FIG. 3 shows a flowchart illustrating a method for annotating at least one object in real-time from a remote device in accordance with some embodiments of the present disclosure.

As illustrated in FIG. 3, the method comprises one or more blocks for remotely annotating at least one object by a real-time annotating unit 101. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, the real-time annotating unit 101 receives a video stream comprising one or more objects from a site device. The site device may be associated with a camera to capture the video stream.

At block 302, identify, by the object identifying module 202 in the real-time annotation unit, the at least one object in the video stream which is to be annotated.

At block 303, determine, by the orientation data determining module 203 in the real-time annotation unit 101, the orientation data 212 of the at least one object identified in the video stream.

At block 304, obtain, by the UCID module 204 in the real-time annotation unit 101, the UCID 213 associated with each of the at least one object form the object database 105.

At block 305, provide the UCID 213 associated with the at least one object to the remote device 106.

At block 306, receive the annotated data 214 from the remote device 106 which is generated based on the remote expert inputs and the UCID 213.

At block 307, convert, by the converting module 205 in the real-time annotation unit 101, the annotated data 214 into the 3D space coordinates.

At block 308, render, the rendering module in the real-time annotation unit 101, the annotated data 214 in 3D space coordinates on the at least one object based on the orientation data 212.

Figure 4:
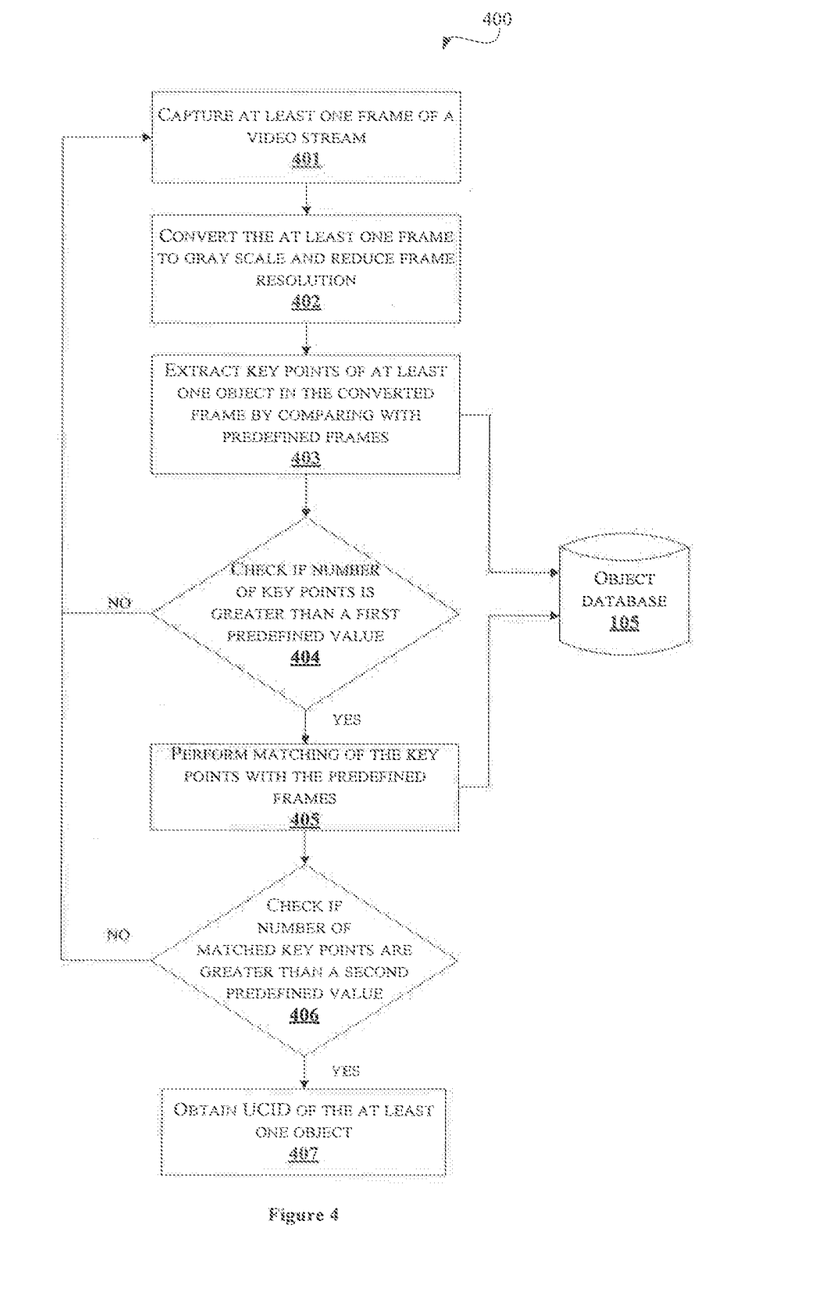
FIG. 4 shows a flowchart illustrating a method for identifying at least one object and obtaining UCID of the at least one object in accordance with some embodiments of the present disclosure.

FIG. 4 shows a flowchart illustrating a method for identifying at least one object and obtaining UCID of the at least one object in accordance with some embodiments of the present disclosure.

As illustrated in FIG. 4, the method comprises one or more blocks for remotely annotating at least one object by a real-time annotating unit 101. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401, capture at least one frame 210 of a video stream from the site device in the real-time annotating unit 101.

At block 402, convert the at least one frame 210 to gray-scale and reduce frame resolution. In one embodiment, the at least one frame is converted to gray-scale and frame resolution is reduced for faster processing of the real-time annotating unit 101.

At block 403, extract key points of at least one object in the converted frame by comparing with the predefined frames 211 where the predefined frames 211 are obtained from the object database 105. In one embodiment, the key points may be extracted by implementing Oriented Fast and Rotated Brief (ORB) feature detector.

At block 404, check if number of key points is greater than a first predefined value. If the number of key points is greater than the first predefined value, perform block 404. If the number of key points is lesser than the first predefined value, perform block 401.

At block 405, perform matching of the key points with the predefined frames 211 where the predefined frames 211 are obtained from the object database 105.

At block 406, check if number of matched key points is greater than a second predefined value. If the number of matched key points is greater than the second predefined value, perform block 407. If the number of matched key points is lesser than the second predefined value, perform block 401.

At block 407, obtain the UCID of the at least one object form the object database 105 based on the matched key points.

Figure 5A:
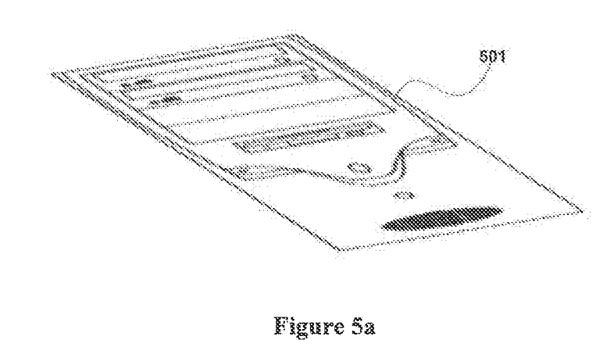
FIG. 5a shows an exemplary embodiment of at least one object in a video stream received from a site device in accordance with some embodiments of the present disclosure.

FIG. 5a shows an exemplary embodiment of at least one object 501 in a video stream received from a site device in accordance with some embodiments of the present disclosure.

In one exemplary embodiment, the at least one object 501 as shown in FIG. 5a may be a Central Processing Unit (CPU) in the video stream, received from the site device and is displayed on a display associated with the real-time annotating unit 101. Orientation of the at least one object 501 in the video stream may be different from orientation of the at least one predefined object frame associated with the at least one object 501. The at least one frame 210 of the video stream is captured and used to identify the at least one object in the video stream. The identifying of the at least one object is performed by the method as described in FIG. 4.

Figure 5B:
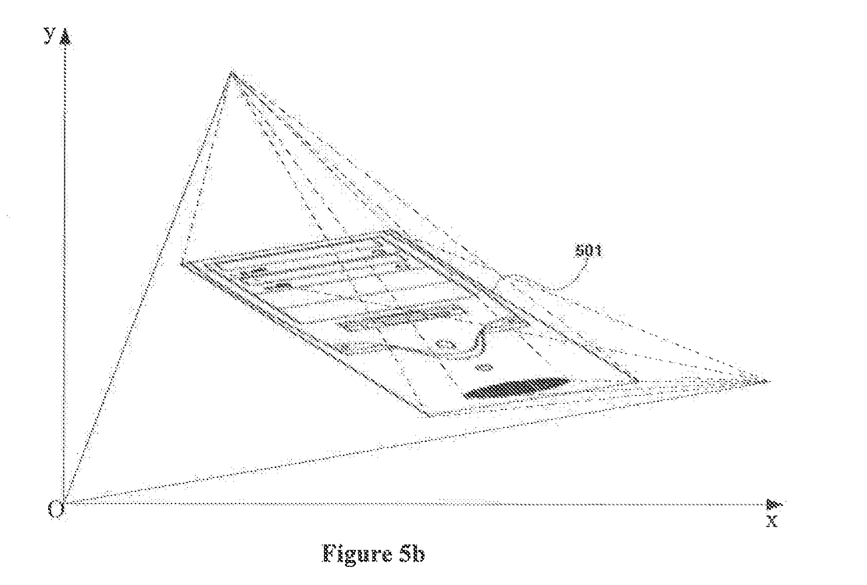
FIG. 5b shows an exemplary embodiment of at least one object illustrating determination of orientation data of the at least one object in accordance with some embodiments of the present disclosure.

FIG. 5*b* shows an exemplary embodiment of at least one object 501 illustrating determination of orientation data of the at least one object 501 in accordance with some embodiments of the present disclosure.

Figure 5C:
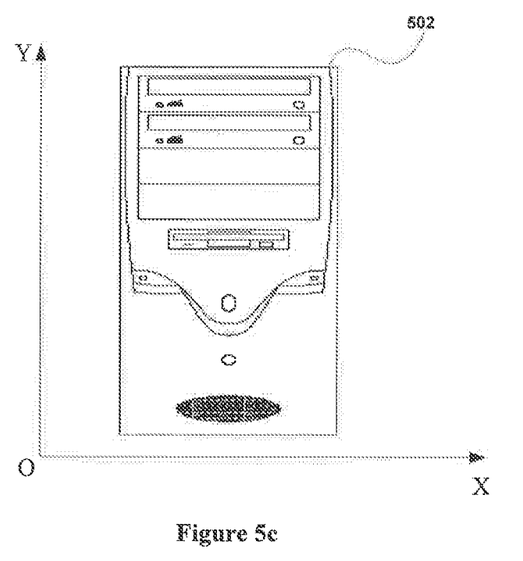
FIG. 5c shows an exemplary embodiment of predefined object frame comprising at least one object for determining orientation data of at least one object in accordance with some embodiments of the present disclosure.

FIG. 5*c* shows an exemplary embodiment of predefined object frame 502 comprising at least one object for determining orientation data of at least one object in accordance with some embodiments of the present disclosure.

The orientation data 212 of the at least one object is determined upon the identification. The orientation data in determined in xy coordinate space as shown in FIG. 5*b*. Orientation data 212 is determined by comparing the at least one frame 210 comprising the at least one object 501 with the predefined object frame. The predefined object frame 502 is obtained is selected from the predefined frames in the object database based on the UCID. The predefined object frame 502 comprising the at least one object 501 is as shown in the FIG. 5*c*. Orientation of the at least one object 501 in the predefined object frame 502 is determined in XY coordinate space. The orientation of the at least one object 501 in the video stream and the orientation of the at least one object 501 in the predefined object frame 502 is compared to obtain the orientation data 212. Relation between the orientation of the at least one object 501 in the video stream and the orientation of the at least one object 501 in the predefined object frame 502 is given as in equation 1 and 2.

$$X = \frac{ax + by + c}{gx + hy + 1} \quad 1$$

$$Y = \frac{dx + ey + f}{gx + hy + 1} \quad 2$$

where a, b, c, d, e, f, g and h are constants.
Further the homogenous coordinates of the at least one object 501 may be given by as in equation 3.

$$(x,y,z) = (wx, wy, wz) \quad 3$$

where w is homogenous vertex coordinates.
From equations 1, 2 and 3 the orientation data of at least one object is determined.

Figure 5D:
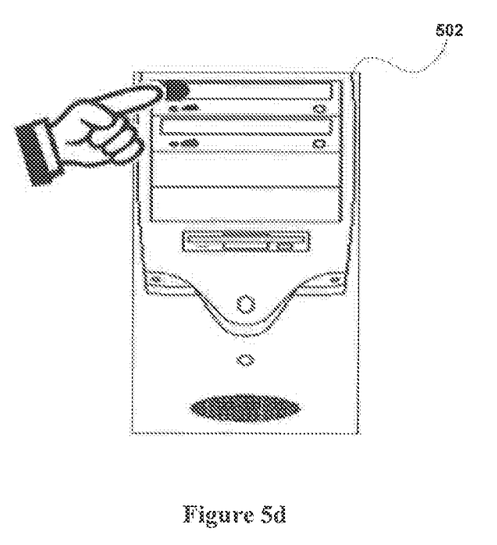
FIG. 5d shows an exemplary embodiment of predefined object frame illustrating remote expert inputs provided at remote device in accordance with some embodiments of the present disclosure.

FIG. 5*d* shows an exemplary embodiment of predefined object frame 502 illustrating remote expert inputs provided at remote device in accordance with some embodiments of the present disclosure.

Upon the identification, the UCID 213 associated with the at least one object 501 is obtained from the object database 105 and provided to the remote device 106. Upon receiving the UCID 213, the remote device 106 fetches the predefined object frame 502 associated with UCID 213 from the object database 105. The obtained predefined object frame 502 is displayed on display on the remote device 106. The expert at the remote device 106 may provide the remote expert inputs on the display. In one embodiment, the remote expert inputs may be touch of the expert on the display indicating a specific point on the at least one object 501. Along with the remote expert inputs, an audio communication is provided between the real-time annotating unit 101 and the remote device 106 for communication between the expert and a user at the real-time annotating unit 101. In one non-limiting embodiment, the expert may provide the remote expert inputs through one or more other input modules associated with the remote device 106. Based on the remote expert inputs and the UCID 213, the annotated data 214 is provided to the real-time annotating unit 101.

Figure 5E:
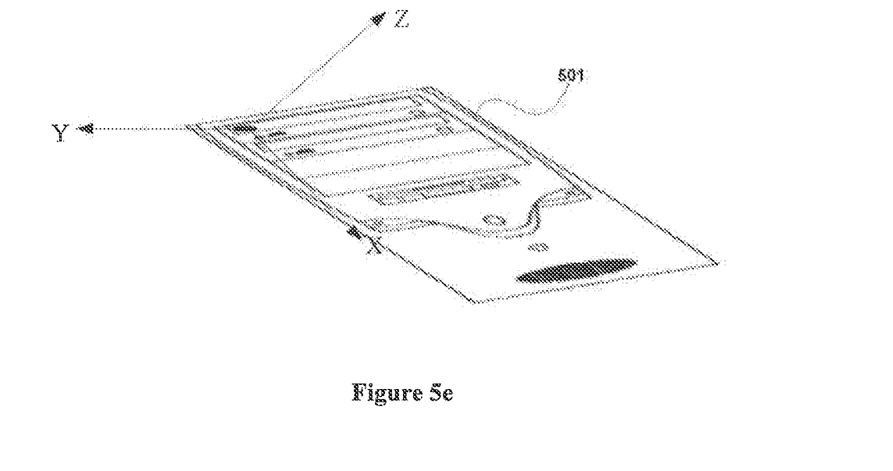
FIG. 5e shows an exemplary embodiment of at least one object illustrating converting of annotated data in 3D space co-ordinates in accordance with some embodiments of the present disclosure.

FIG. 5*e* shows an exemplary embodiment of at least one object 501 illustrating converting of annotated data 214 in 3D space co-ordinates in accordance with some embodiments of the present disclosure.

The annotated data 214 is received by the real-time annotation unit 101 in XY coordinate space. The XY coordinates of the annotated data 214 is normalized with respect to centre of the orientation of the at least one object 501 initially based on the width and height of the at least one object 501 in the video stream. The position of the normalized annotated data on the at least one object 501 is determined based on the orientation data 212 as shown in FIG. 5*e*.

Figure 5F:
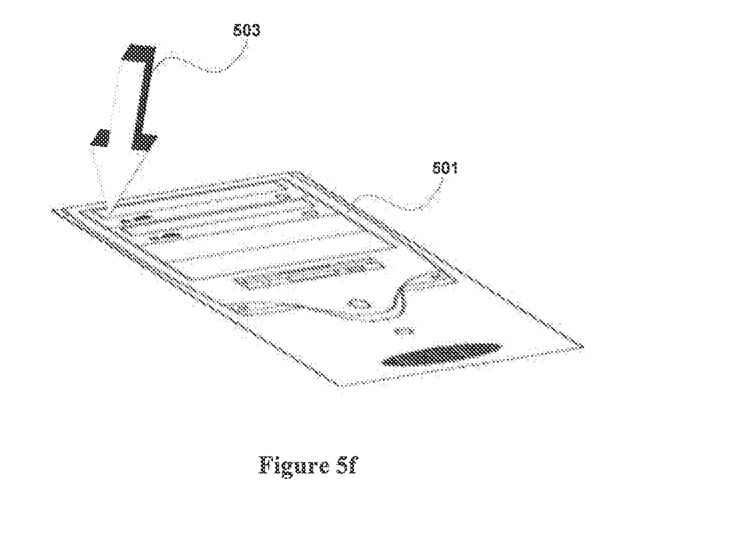
FIG. 5f shows an exemplary embodiment of at least one object illustrating rendering of annotated data in 3D space co-ordinates on at least one object in accordance with some embodiments of the present disclosure.

FIG. 5*f* shows an exemplary embodiment of at least one object 501 illustrating rendering of annotated data in 3D space co-ordinates on at least one object 501 in accordance with some embodiments of the present disclosure;

Upon determining the position of the normalized annotated data, the normalized annotated data 214 is converted to a 3D model and rendered on the video stream comprising at least one object. In an example, the 3D model of annotated data may be a marker 503 as shown in FIG. 5*f*. The marker 503 points at the at least one object 501 indicating the annotations provided by the expert at the remote device 106.

Computer System

Figure 6:
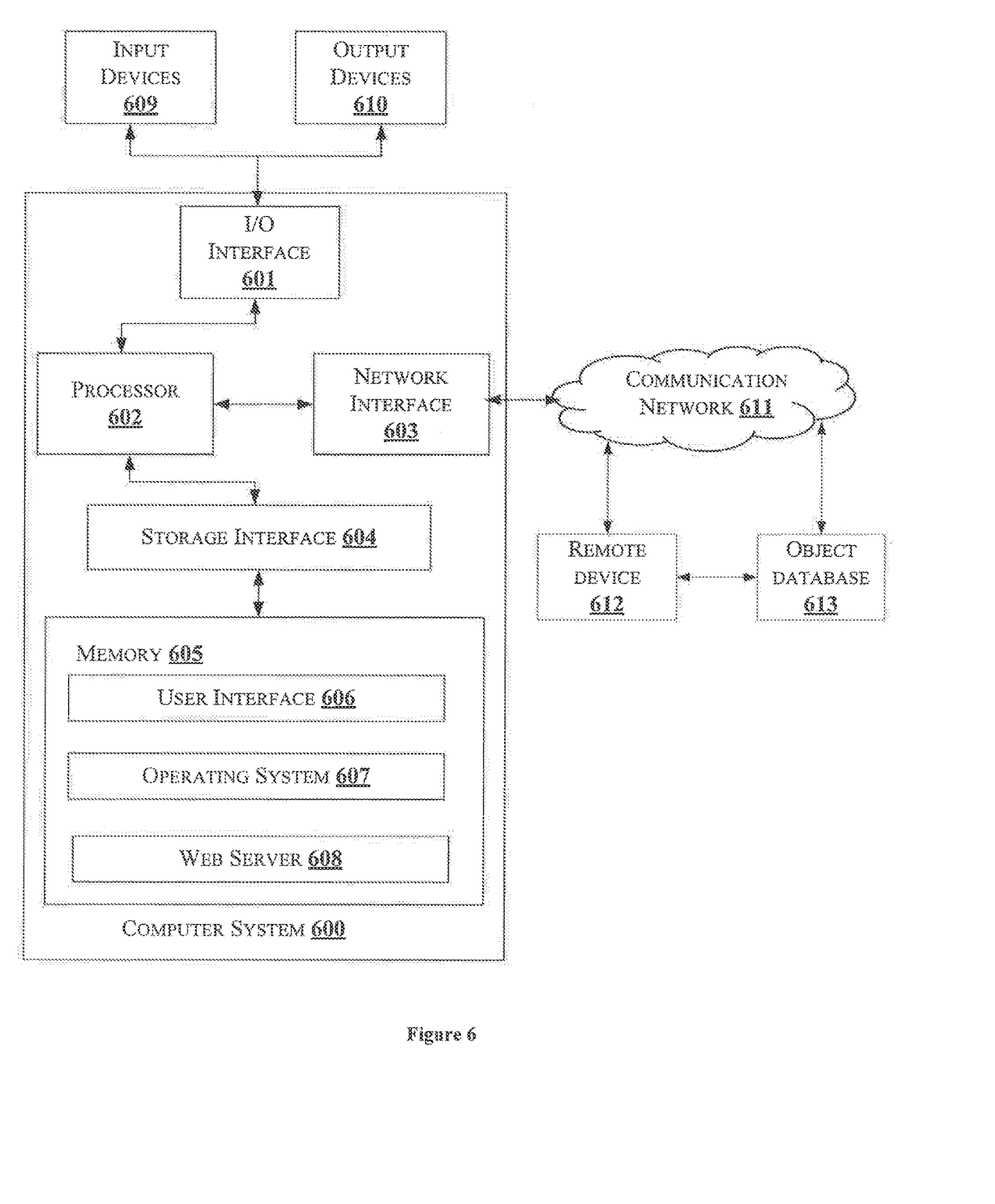
FIG. 6 is a block diagram of an exemplary computer system for implementing some embodiments consistent with the present disclosure.

FIG. 6 is a block diagram of an exemplary computer system for implementing some embodiments consistent with the present disclosure.

In an embodiment, the computer system 600 is used to implement the performance management unit 102. The computer system 600 may comprise a central processing unit ("CPU" or "processor") 602. The processor 602 may comprise at least one data processor for executing program components for managing the performance of at least one instrumentation device deployed across one or more sites. The processor 602 may include specialized processing units such as integrated system (bus) controllers, memory management control units, floating point units, graphics processing units, digital signal processing units, etc.

The processor 602 may be disposed in communication with one or more input/output (I/O) devices (not shown) via I/O interface 601. The I/O interface 601 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 601, the computer system 600 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 600 is connected to a remote device 612 and an object database 613 through a communication network 611. The processor 602 may be disposed in communication with the communication network 609 via a network interface 603. The network interface 603 may communicate with the communication network 609. The network interface 603 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 609 may include, without limitation, a direct interconnection, local area network (LAN), wide area network (WAN), wireless network (e.g., using Wireless Application Protocol), the Internet, etc. Using the network interface 603 and the communication network 611, the computer system 600 may communicate with the remote device 612 and the object database 613. The network interface 603 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 611 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 602 may be disposed in communication with a memory 605 (e.g., RAM, ROM, etc. not shown in FIG. 6) via a storage interface 604. The storage interface 604 may connect to the memory 605 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, user interface 606, an operating system 607, web server 608 etc. In some embodiments, computer system 600 may store user/application data (not shown in figure), such as the data, variables, records, etc. as described in this disclosure. Such databases may be implemented as fault-tolerant, relational, scalable, secure databases such as Oracle or Sybase.

The operating system 607 may facilitate resource management and operation of the computer system 600. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/6/8, etc.), Apple iOS, Google Android, Blackberry OS, or the like.

In some embodiments, the computer system 600 may implement a web browser 608 stored program component. The web browser 608 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 608 may utilize facilities such as AJAX, DHTML, Adobe Flash, JavaScript, Java, Application Programming Interfaces (APIs), etc. In some embodiments, the computer system 600 may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 600 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, nonvolatile memory, hard drives, CD ROMs, DVDs, flash drives, disks, and any other known physical storage media.

Embodiments of the present disclosure provide a faster and reliable annotating unit to provide annotations from a remote place in real-time. In the present disclosure, instead of sending the image or video to the remote expert, UCID of the object is sent to the remote expert which may require less bandwidth.

Embodiments of the present disclosure provide an annotating unit with lesser turn-around time since the need of expert's visit to site location to examine the object is eliminated.

Embodiments of the present disclosure provide voice communication along with the annotations for easier interpretation and resolving of problems.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 and FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 101 | Real-time annotating unit |
| 102 | I/O interface |
| 103 | Processor |
| 104 | Memory |
| 105 | Object database |
| 106 | Site device |
| 107 | I/O interface |
| 108 | Processor |
| 109 | Memory |
| 201 | Modules |
| 202 | Object identifying module |
| 203 | Orientation data determining |
| 204 | UCID module |
| 205 | Converting module |
| 206 | Rendering module |
| 207 | Audio communication module |
| 208 | Other modules |
| 209 | Data |
| 210 | At least one frame of video stream |
| 211 | Predefined frames |
| 212 | Orientation data |
| 213 | UCID |
| 214 | Annotated data |
| 215 | 3D space coordinates |
| 216 | Converted annotation data |
| 217 | New UCID |
| 218 | Other Data |
| 501 | At least one object |
| 502 | Predefined object frame |
| 503 | Marker |
| 600 | Computer System |
| 601 | I/O Interface |
| 602 | Processor |
| 603 | Network Interface |
| 604 | Storage Interface |
| 605 | Memory |
| 606 | User Interface |
| 607 | Operating System |
| 608 | Web Server |
| 609 | Input Devices |
| 610 | Output Devices |

-continued

| Reference Number | Description |
|---|---|
| 611 | Communication Network |
| 612 | Remote device |
| 613 | Object database |

What is claimed is:

1. A method for remotely annotating at least one object in real-time, the method comprising:
 receiving, by a real-time annotating processor, a video stream comprising one or more objects from a site device;
 identifying, by the real-time annotating processor, the at least one object in the video stream to be annotated by comparing at least one frame of the video stream with predefined frames comprising the one or more objects in an object database, wherein the comparing includes matching a number of key points of the at least one object with the predefined frames if the number of key points is greater than predefined value;
 determining, by the real-time annotating processor, orientation data of the at least one object identified in the video stream;
 obtaining, by the real-time annotating processor, a unique context identifier (UCID) associated with each of the at least one object from the object database based on the identification;
 providing, by the real-time annotating processor, the UCID associated with the at least one object to a remote device;
 receiving, by the real-time annotating processor, annotated data, from the remote device, generated based on the UCID and remote expert inputs;
 converting, by the real-time annotating processor, the annotation data to three dimensional (3D) space coordinates; and
 rendering, by the real-time annotating processor, the converted annotated data on the at least one object based on the orientation data for remotely annotating at least one object in real-time.

2. The method as claimed in claim 1 further comprises initiating an audio communication between the real-time annotating processor and the remote device.

3. The method as claimed in claim 1, wherein the identifying the at least one object comprises:
 determining a new object upon identifying that the at least one frame of the video frame is not matching with any of the predefined frames;
 creating a new UCID for the new object; and
 updating the object database with the new object and the new UCID.

4. The method as claimed in claim 3 further comprises providing the new object and the new UCID to the remote device.

5. The method as claimed in claim 1, wherein determining the orientation data comprises comparing the at least one frame comprising the at least one object with a predefined object frame obtained from an object database.

6. The method as claimed in claim 1, wherein, the orientation data comprises orientation coordinates and location coordinates of the at least one object.

7. The method as claimed in claim 1, wherein the annotation data in 3D space coordinated is rendered on the at least one object in a visual format.

8. A real-time annotating unit for remotely annotating at least one object in real-time, comprising:
 a processor; and
 a memory communicatively coupled to the processor, wherein the memory stores processor-executable instructions, which, on execution, cause the processor to:
 receive a video stream comprising one or more objects from a site device;
 identify the at least one object in the video stream to be annotated by comparing at least one frame of the video stream with predefined frames comprising the one or more objects in an object database, wherein the comparing includes matching a number of key points of the at least one object with the predefined frames if the number of key points is greater than a predefined value;
 determine orientation data of the at least one object identified in the video stream;
 obtain a unique context identifier (UCID) associated with each of the at least one object from the object database based on the identification;
 provide the UCID associated with the at least one object to a remote device;
 receive annotated data, from the remote device, generated based on the UCID and remote expert inputs;
 convert the annotation data to three dimensional (3D) space coordinates; and
 render the converted annotated data on the at least one object based on the orientation data for remotely annotating at least one object in real-time.

9. The real-time annotating unit as claimed in claim 8 further comprises initiating an audio communication between the real-time annotating unit and the remote device.

10. The real-time annotating unit as claimed in claim 8, wherein the identifying the at least one object comprises:
 determining a new object upon identifying that the at least one frame of the video frame is not matching with any of the predefined frames;
 creating a new UCID for the new object; and
 updating the object database with the new object and the new UCID.

11. The real-time annotating unit as claimed in claim 10 further comprises providing the new object and the new UCID to the remote device.

12. The real-time annotating unit as claimed in claim 8, wherein determining the orientation data comprises comparing the at least one frame comprising the at least one object with a predefined object frame obtained from an object database.

13. The real-time annotating unit as claimed in claim 8, wherein the orientation data comprises orientation coordinates and location coordinates of the at least one object.

14. The real-time annotating unit as claimed in claim 8, wherein the annotation data in 3D space coordinated is rendered on the at least one object in a visual format.

15. A non-transitory computer readable medium including instructions stored thereon that when processed by at least one processor cause a device to perform operations comprising:
 receiving a video stream comprising one or more objects from a site device;
 identifying the at least one object in the video stream to be annotated by comparing at least one frame of the video stream with predefined frames comprising the one or more objects in an object database, wherein the comparing includes matching a number of key points of the at least one object with the predefined frames if the number of key points greater than a predefined value;

determining orientation data of the at least one object identified in the video stream;

obtaining a unique context identifier (UCID) associated with each of the at least one object from the object database based on the identification;

providing the UCID associated with the at least one object to a remote device;

receiving annotated data, from the remote device, generated based on the UCID and remote expert inputs;

converting the annotation data to three dimensional (3D) space coordinates; and rendering the converted annotated data on the at least one object based on the orientation data for remotely annotating at least one object in real-time.

16. The non-transitory computer readable medium as claimed in claim 15 further comprises initiating an audio communication between the real-time annotating unit and the remote device.

17. The non-transitory computer readable medium as claimed in claim 15, wherein the identifying the at least one object comprises:

determining a new object upon identifying that the at least one frame of the video frame is not matching with any of the predefined frames;

creating a new UCID for the new object; and updating the object database with the new object and the new UCID.

18. The non-transitory computer readable medium as claimed in claim 17 further comprises providing the new object and the new UCID to the remote device.

19. The non-transitory computer readable medium as claimed in claim 15, wherein determining the orientation data comprises comparing the at least one frame comprising the at least one object with a predefined object frame obtained from an object database.

20. The non-transitory computer readable medium as claimed in claim 15, wherein the orientation data comprises orientation coordinates and location coordinates of the at least one object.

21. The non-transitory computer readable medium as claimed in claim 15, wherein the annotation data in 3D space coordinated is rendered on the at least one object in a visual format.

* * * * *